US007356249B2

(12) United States Patent
Ota et al.

(10) Patent No.: US 7,356,249 B2
(45) Date of Patent: Apr. 8, 2008

(54) APPARATUS AND METHOD FOR RECORDING/REPRODUCING DATA, WHICH ENABLE READING OF DATA RECORDED EVEN WHEN THE APPARATUS STOPS DUE TO A POWER FAILURE

(75) Inventors: Kiyoshi Ota, Tokyo (JP); Toshimasa Mizunashi, Kanagawa (JP); Akio Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1372 days.

(21) Appl. No.: 09/904,793

(22) Filed: Jul. 13, 2001

(65) Prior Publication Data

US 2002/0048223 A1  Apr. 25, 2002

(30) Foreign Application Priority Data

Jul. 14, 2000 (JP) .............................. 2000-215108

(51) Int. Cl.
  H04N 5/00 (2006.01)
  H04N 5/91 (2006.01)
(52) U.S. Cl. ........................................ 386/125; 386/46
(58) Field of Classification Search .................... None
  See application file for complete search history.

(56) References Cited

U.S. PATENT DOCUMENTS 6,061,215 A  5/2000 Tomita 6,393,201 B1  5/2002 Sakuramoto et al.
6,675,180 B2 *  1/2004 Yamashita ................... 707/204
6,832,040 B2 * 12/2004 Sakuramoto et al. ......... 386/95
2001/0051954 A1 12/2001 Yamashita

FOREIGN PATENT DOCUMENTS

EP  0 823 816  2/1998
EP  0 971 358  1/2000

OTHER PUBLICATIONS

Stephen C. Tweedie: "Journaling the Linux ext2fs Filesystem", LINUXEXPO'98, 'Online! 1998, pp. 1-8, XP002270499; Retrieved from the Internet: <URL:http://WWW.osdever.net/docs/journal-design.pdf?the_id=38>, 'retrieved on Feb. 16, 2004.
Patent Abstracts of Japan; vol. 1998, No. 09, Jul. 31, 1998; JP 10 097785 A (Sony Corp), Apr. 14, 1998.

* cited by examiner

Primary Examiner—John Miller
Assistant Examiner—Heather R. Jones
(74) Attorney, Agent, or Firm—Frommer Lawrence & Haug LLP; William S. Frommer; Thomas F. Presson

(57) ABSTRACT

The hard disc is provided with two areas for storing file system management information and content management information. The disc recorder records double file system management information and content management information onto the hard disc. Further, information indicating a procedure for updating file system management information is described in a flash descriptor, and a procedure for updating content management information is described in a robust descriptor.

18 Claims, 9 Drawing Sheets

| PROCESSING STAGE ||
|---|---|
| FILE NAME | FILE SIZE |
| FILE NAME | FILE SIZE |
| FILE NAME | FILE SIZE |
| ⋮ | ⋮ |
| FILE NAME | FILE SIZE |

FIG.7

APPARATUS AND METHOD FOR RECORDING/REPRODUCING DATA, WHICH ENABLE READING OF DATA RECORDED EVEN WHEN THE APPARATUS STOPS DUE TO A POWER FAILURE

BACKGROUND OF THE INVENTION

The present invention relates to an apparatus and method for recording data onto a recording medium, an apparatus and method for recording/reproducing AV data onto/from a disc-like recording medium, and a disc-like recording medium provided with a recording area for management information concerning data to be recorded.

For example, in recordable/reproducible disc-recording media and recordable/reproducible tape-like recording media, management information concerning the file system and management information concerning contents are recorded in a predetermined management area in the medium. These management information of the file system and of the contents include, for example, file names, recording address of files, file lengths, root directories, image recording start times, recording periods, broadcasting channel names, program titles, compression information, time stamps, and the like.

The management information concerning the file system and contents, as described above, is updated when recording of a content is completed. For example, when a user presses a recording completion button or the like, management information in the management area is updated by writing management information managed in an internal memory into a recording medium. A content newly recorded on a recording medium can be reproduced by thus recording the content and updating the management information.

A file system for recording data onto a disc-like recording medium is described in, for example, ISO/IEC13346; 1995 "Information technology—Volume and file structure of write-once and rewritable media using non-sequential recording for information interchange".

However, there is a case that the system stops during recording of a content due to a power failure or run-down battery. In this case, recording operation stops although management information is not recorded. Therefore, the content cannot be read out since its management information is not recorded although the content is recorded actually in the recording medium. In addition, not only a newly recorded content cannot be read out but also management information thereof is broken so that contents which have already been recorded cannot be read out in some cases if a power failure or the like occurs while management information of the file system or management information of a content is being written.

To solve this problem, for example, the system controller monitors the power source voltage. When the power voltage decreases, management information managed in an internal memory is written into a non-volatile memory to create a backup.

This method, however, has a problem as follows. A capacitor having a large capacity is necessary to guarantee data writing operation of the system controller, and a limitation is required for the data size of data to be written. It is difficult to use a DRAM requiring a large current for an internal memory, and it is necessary to use optionally a backup function such as a non-volatile memory or the like. This method is thus not preferable to achieve low costs and downsizing.

BRIEF SUMMARY OF THE INVENTION

The present invention has been made in view of this situation and has an object of providing a data recording apparatus and a data recording method, a data recording/reproducing apparatus and a data recording/reproducing method, and a disc-like recording medium, which enable reading of data recorded on a recording medium, even when the apparatus stops due to a power failure or the like.

A data recording apparatus according to the present invention comprises: data recording means for recording data on a recording medium; management information recording means for recording management information of the data onto the recording medium or a non-volatile memory; and a system controller for managing the management information and for controlling the data recording means and the management information recording means, and is characterized in that the system controller periodically records the management information onto the recording medium or the non-volatile memory.

A data recording method according to the present invention is characterized in that management information of data to be recorded onto a recording medium is generated, and the management information is periodically recorded onto the recording medium or a non-volatile memory.

A data recording/reproducing apparatus according to the present invention comprises: management means for generating management information to be recorded onto the disc-like recording medium; and control means for performing recording/reproducing control on the disc-like recording medium, and is characterized in that first and second management areas for storing management information and a procedure storage area for storing recording procedure of recording management information into each of the management areas, and the control means records same management information into the first and second management areas, and records information indicating that writing of management information onto the first management area is started and information indicating that writing of management information onto the second area is started, into the procedure storage area.

A data recording/reproducing apparatus according to the present invention comprises: a file system for generating management information of a file system of the disc-like recording medium; file management means for generating file management information of content data to be recorded onto the disc-like recording medium; and control means for control of recording/reproducing with respect to the disc-like recording medium, and is characterized in that first and second file system management areas for storing management information of the file system, first and second content data management areas for storing management information of content data, a first procedure storage area for storing recording procedure information of recording onto each of the file system management areas, and a second procedure storage area for storing recording procedure information onto the content data management areas are provided in the disc-like recording medium, and the control means records same file system management information onto the first and second file system management areas, records same content data management information onto the first and second content data management areas, records information indicating that writing of the file system management information onto the first file system management area is started as well as information indicating that writing of the file system management information onto the second file system management area is started, onto the first procedure storage area, and records information indicating that writing of the content data management information onto the first content data management area is started as well as information indicating that writing of the content data management information onto the second content data management area is started, onto the second procedure storage area.

A data recording/reproducing method according to the present invention is characterized in that management information to be recorded onto the disc-like recording medium is generated, first and second management areas for storing the management information and a procedure storage area for storing recording procedure information the management information onto the management areas are provided on the disc-like recording medium, and same management information is recorded onto the first and second management areas, and information indicating that writing of management information onto the first management area is started and information indicating that writing of management information onto the second management area is started are recorded onto the procedure storage area.

A data recording/reproducing method according to the present invention is characterized in that first and second file system management areas for storing management information of a file system, first and second content data management areas for storing management information of content data, a first procedure storage area for storing recording procedure information onto each of the file system management areas, and a second procedure storage area for storing recording procedure information onto the content data management areas are provided on the disc-like recording medium, management information of the file system of the disc-like recording medium is generated, file management information of content data to be recorded onto the disc-like recording medium is generated, same file system management information is recorded onto the first and second file system management areas, same content data management information is recorded onto the first and second content data management areas, information indicating that writing of file system management information onto the first file system management area is started and information indicating that writing of file system management information onto the second file system management area is started are recorded onto the first procedure storage area, and information indicating that writing of content data management information onto the first content data management area is started and information indicating that writing of content data management information onto the second content data management area is started are recorded onto the second procedure storage area.

A disc-like recording medium according to the present invention comprises: first and second management areas provided for storing management information of content date to be recorded; and a procedure storage area provided for storing recording procedure information management information onto each of the management areas, and is characterized in that same management information is recorded onto the first and second management areas, and information indicating that writing of management information onto the first management area is started and information indicating that writing of management information onto the second management area are recorded onto the procedure management area.

A disc-like recording medium according to the present invention comprises: first and second file system management areas for storing management information of the file system; first and second content data management areas for storing management information of content data to be recorded; a first procedure storage area for storing recording procedure information onto each of the file system management areas; and a second procedure storage area for storing recording procedure information onto the content data management areas, and is characterized in that same file system management information is recorded onto the first and second management areas, same content data management information is recorded onto the first and second content data management areas, information indicating that writing of file system management information onto the first file system management area is started and information indicating that writing of file system management information onto the second file system management area is started are recorded onto the first procedure management area, and information indicating that writing of content data management information onto the first content data management area is started and information indicating that writing of content data management information onto the second content data management area is started are recorded onto the second procedure management area.

In the date recording apparatus and method according to the present invention, management information of data to be recorded onto a recording medium is recorded periodically onto a recording medium or non-volatile memory. Thus, according to the present invention, data recorded on a recording medium can be read even if the apparatus stops due to a power failure or the like.

In the data recording/reproducing apparatus and method according to the present invention, same management information is recorded double on two areas, and the procedure of recording management information is recorded. As a result, in the data recording/reproducing apparatus and method according to the present invention, either one of the two pieces of recorded management information can always be read so that recorded data can be read, even if the apparatus stops due to a power failure or the like.

In the disc-like recording medium according to the present invention, double recording areas for management information of recorded data are provided. As a result of this, in the disc-like recording medium according to the present invention, either one of the two pieces of recorded management information can always be read so that recorded data can be read, even if the apparatus stops due to a power failure or the like.

BRIEF DESCRIPTION OF THE SEVERAL VIEWS OF THE DRAWINGS

FIG. 7 is a view showing contents of a description of a transaction descriptor;

DETAILED DESCRIPTION OF THE INVENTION

Explanation will be made of a digital video recorder as an embodiment to which the present invention is applied. The digital video recorder explained below is inputted with an audio/video (A/V) signal broadcasted as an analogue ground wave, an A/V signal inputted from a video terminal and digital MPEG (Moving Picture Experts Group) data. They are recorded as MPEG data on a hard disc, and MPEG data recorded on the hard disc is reproduced and outputted to the outside, as an NTSC (National Television System Committee) signal or MPEG data.

Figure 1:
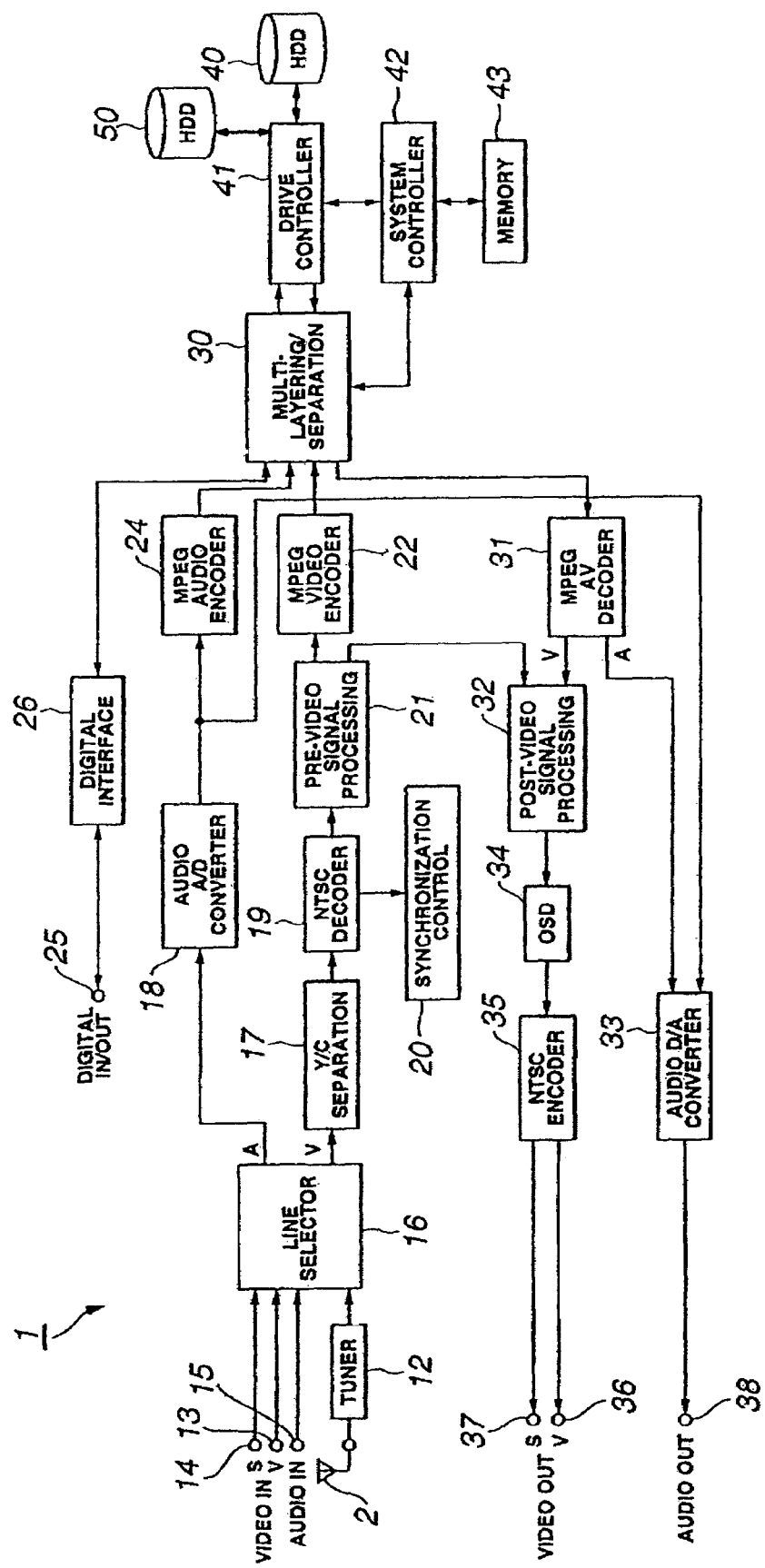
FIG. 1 is a block diagram showing the configuration of a digital video recorder according to the present invention.

FIG. 1 shows a structural block diagram of the digital video recorder according to the embodiment of the present invention.

As shown in FIG. 1, the digital video recorder 1 comprises a tuner 12, a V-input terminal 13, an S-input terminal 14, an audio input terminal 15, a line selector 16, a Y/C separation circuit 17, an audio A/D converter 18, an NTSC decoder 19, a synchronization control circuit 20, a pre-video signal processing section 21, an MPEG video encoder 22, an MPEG audio encoder 24, a digital input/output terminal 25, a digital interface circuit 26, a multi-layer/separation circuit 30, an MPEG AV decoder 31, a post-video signal processing circuit 32, an audio D/A converter 33, an OSD (On Screen Display) 34, an NTSC encoder 35, a V-output terminal 36, an S-output terminal 37, and an audio output terminal 38.

The tuner 12 is inputted with a television broadcast wave received through an antenna 2. The tuner 12 demodulates the television broadcast wave and outputs a composite video signal and an analogue audio signal.

The V-input terminal 13 is inputted with a composite video signal from the outside.

The S-input terminal 14 is inputted with a component video signal subjected to so-called YC separation.

The audio input terminal 15 is inputted with an audio signal.

The line selector 16 is supplied with video signals and audio signals, which are inputted to the tuner 12, the V-input terminal 13, the S-input terminal 14, and the audio input terminal 15. The line selector 16 selects any one of video input signals, in accordance with switch setting made by a user. A selected video signal is supplied to the Y/C separation circuit 17, and a selected audio signal is supplied to the audio A/D converter 18.

The Y/C separation circuit 17 separates a luminance component and a chrominance component from a supplied video signal, to obtain a component signal. In case where a supplied video signal is a video signal of a component inputted from the S-terminal 15, the luminance and chrominance have already been separated, and therefore, separation processing is not carried out. A signal from which the luminance and chrominance components have been separated is supplied to the NTSC decoder 19.

The NTSC decoder 19 performs processing, such as A/D conversion and chroma encoding, on the video signal from which luminance and chrominance components have been separated, and outputs digital component data (hereinafter simply called image data). This image data is supplied to the pre-video signal processing circuit 21. The NTSC decoder 19 also supplies the synchronization control circuit 20 with a clock generated with reference to the horizontal synchronization signal of an input video signal, a horizontal synchronization signal generated by synchronous separation, a vertical synchronization signal, and a field determination signal.

The synchronization control circuit 20 converts various synchronization signals supplied from the NTSC decoder 19, into timing signals corresponding to various circuits, and supplies them to respective circuits of the MPEG video encoder 22 and the like.

The pre-video signal processing circuit 21 performs various video signal processing such as filtering processing and the like on inputted image data, and supplies the processing result to the MPEG encoder 22 and the post-video signal processing circuit 32.

The MPEG video encoder 22 performs MPEG encode processing on image data, generates an MPEG video stream, and supplies it to the multi-layering/separation circuit 30. Although the MPEG compression system is adopted in this case, another compression system may be used.

The audio A/D converter 18 digitizes an audio signal supplied from the line selector 16, and supplies it to the MPEG audio encoder and the audio D/A converter 33.

The MPEG audio encoder 24 performs MPEG encode processing on the digitized audio signal, generates an MPEG audio stream, and supplies it to the multi-layering/separation circuit 30. Like the case of the image data, not only the MPEG system but also another compression system may be adopted as the compression system.

The digital input/output terminal 25 is connected with, for example, an external IRD (Integrated Receiver Decoder) or the like through a predetermined digital interface such as IEEE 1394 or so. A transport stream (TS) defined by the MPEG system is inputted to and outputted from the terminal.

The digital interface circuit 26 performs format conversion between the data transfer format of the present digital disc recorder 1 and the data format of the digital interface. The digital interface circuit 26 converts a TS inputted from the digital input/output terminal 25 and supplies it to the multi-layering/separation circuit 30. The digital interface circuit 26 converts a TS supplied from the multi-layering/separation circuit 30 and outputs it from the digital input/output terminal 25.

The multi-layering/separation circuit 30 packets the MPEG video stream inputted from the MPEG video encoder 22, the MPEG audio stream inputted from the MPEG audio encoder 24, and various control information supplied from the system controller 42, and multi-layers them to generate a TS defined by the MPEG system. The multi-layering/separation circuit 30 rewrites control data or the like when a TS is inputted through the digital input/output terminal 25, and outputs the TS.

In reproduction, the multi-layering/separation circuit 30 extracts a PES packet from a TS reproduced from the hard disc 40, and supplies it to the MPEG AV decoder 31. When a TS is outputted through the digital input/output terminal 25, the multi-layering/separation circuit 30 rewrites control data upon necessity and outputs a TS reproduced from the hard disc 40.

The MPEG AV decoder 31 separates an inputted PES packet into MPEG video data and MPEG audio data, and performs MPEG decode processing on each of the MPEG video data and MPEG audio data. Image data of a base band, which is obtained by decoding, is supplied to the post-video signal processing circuit 32, and audio data of a base band, which is obtained by decoding, is supplied to the audio D/A converter 33.

The post-video signal processing circuit 32 performs processing such as switching, synthesizing, filtering, and the like on image data from the AV decoder 31 and image data from the pre-video signal processing circuit 21, and supplies the processing result to the OSD 34.

The OSD 34 generates graphics and the like for image display, and performs processing such as synthesizing of the generated graphics on image data, and supplies them to NTSC encoder 35.

The NTSC encoder 35 D/A-converts inputted image data (digital component data) and generates an analogue component signal. Alternatively, the encoder 35 converts inputted image data into digital composite data, thus performs D/A-conversion, and generates an analogue composite signal. The analogue composite signal is outputted from the V-output terminal 36. The analogue component signal is outputted from the S-output terminal 37.

The audio D/A converter 33 selectively switches and inputs audio data from the MPEG AV decoder 31 and audio data from the audio A/D converter 18 to each other. The converter 33 performs D/A conversion and generates an analogue audio signal. The analogue audio signal is outputted from the audio output terminal 38.

Meanwhile, in recording, the drive controller 41 performs control for writing the TS sequentially inputted from the multi-layering/separation circuit 30 into a hard disc 40. In reproducing, the drive controller 41 reads a TS from the hard disc 40 and supplies it to the multi-layering/separation circuit 30.

The system controller 42 performs generation of control data multi-layered over a TS, control of the drive controller 41, and control of the entire apparatus. In addition, the system controller 42 appropriately reads management information of the file system of the hard disc 40, and content management information, as management information and control information of the TS, from the hard disc 40. Also, the system controller 42 newly generates file system management information and content management information, and records them on the hard disc 40. The system controller 40 accesses the hard disc and the TS in accordance with the file system management information and the content management information, and also manages both kinds of information on the memory 43.

The digital video recorder 1 constructed in a structure as described above is inputted with various video signals from the tuner 12, the V-signal output terminal 13, the S-input terminal 14, and the digital interface 25. In recording, one of these signals is selected and recorded as a TS on the hard disc 40.

Meanwhile, in reproducing, a TS outputted from the hard disc 40 is decoded and outputted from the V-output terminal 36 and the S-output terminal 37, or outputted as digital data from the digital input/output terminal 25.

Next, update procedures of the data format, file system, and management information of the hard disc 50 will be explained.

Figure 2:
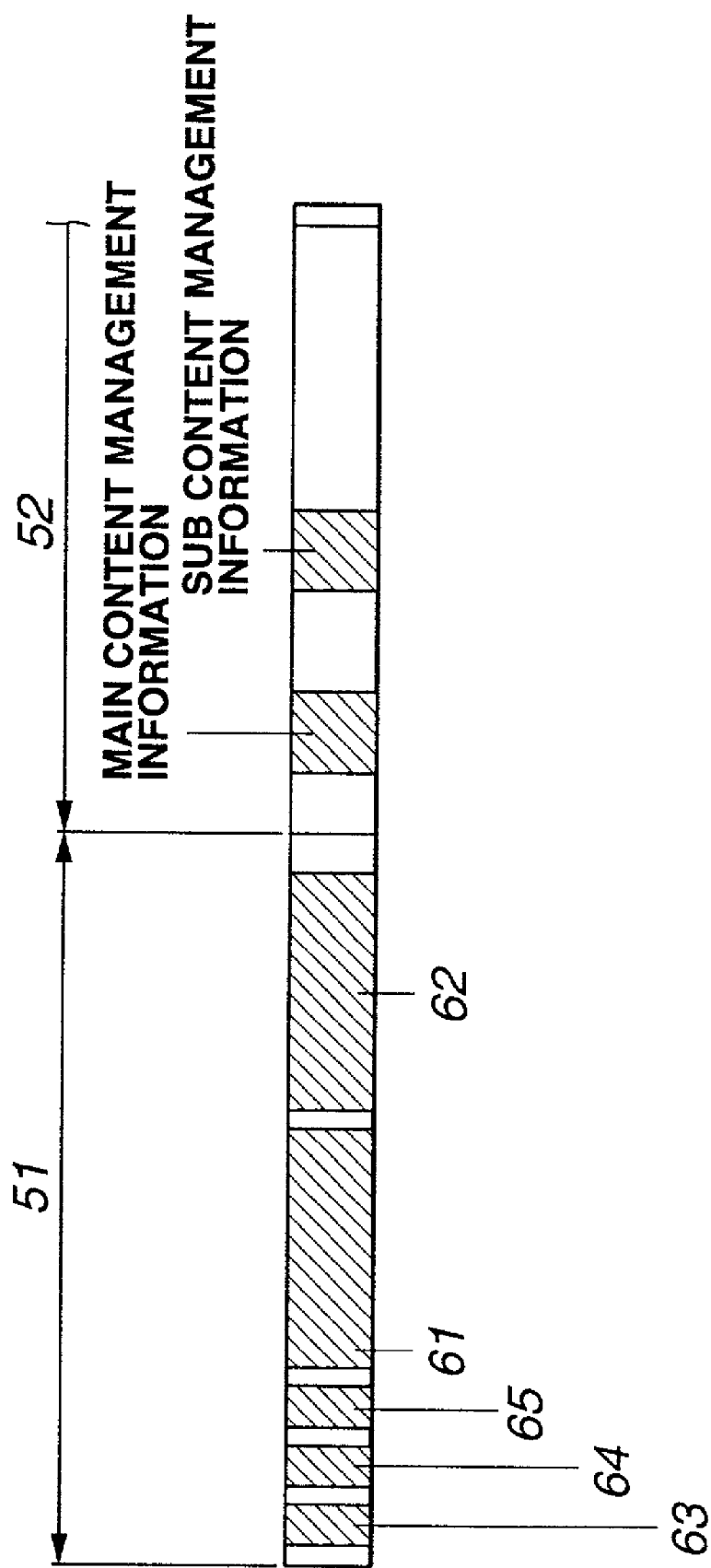
FIG. 2 is an explanatory view for explaining data format of a hard disc.

As shown in FIG. 2, a header area 51 and a data storage area 52 are formed in the hard disc 50.

In the header area 51, there are provided a main file system recording area 61, a sub file system recording area 62, a flash descriptor recording area 63, a robust descriptor recording area 64, and a transaction descriptor recording area 65.

The data storage area 52 records a TS of MPEG format, in units of files, and records two pieces of content management information (main content management information and sub content management information) as management information and control information of the recorded TS, in units of files.

Each of the main file system recording area 61 and the sub file system recording area 62 records file system management information. The file system management information contains, for example, information constructed by routes of files, file names, pointers indicating storage addresses, and the like.

One same piece of file system management information is recorded in each of the main file system recording area 61 and the sub file system recording area 62. File system management information recorded in the main file system recording area 61 is called main file system management information, and file system management information recorded in the sub file system recording area 62 is called sub file system management information.

In order to manage the update status of these pieces of file system management information, update procedure information of the main file system management information and the sub file system management information is recorded on the hard disc 50. The update procedure information of this file system management information is called a flash descriptor. This flash descriptor is stored in the flash descriptor recording area 63 in the header area 51. This flash descriptor describes that information of main file system management information is being updated, that update of the main file system management information has been completed, that sub file system management information is being updated, and that update of sub file system management information has been completed.

Figure 3:
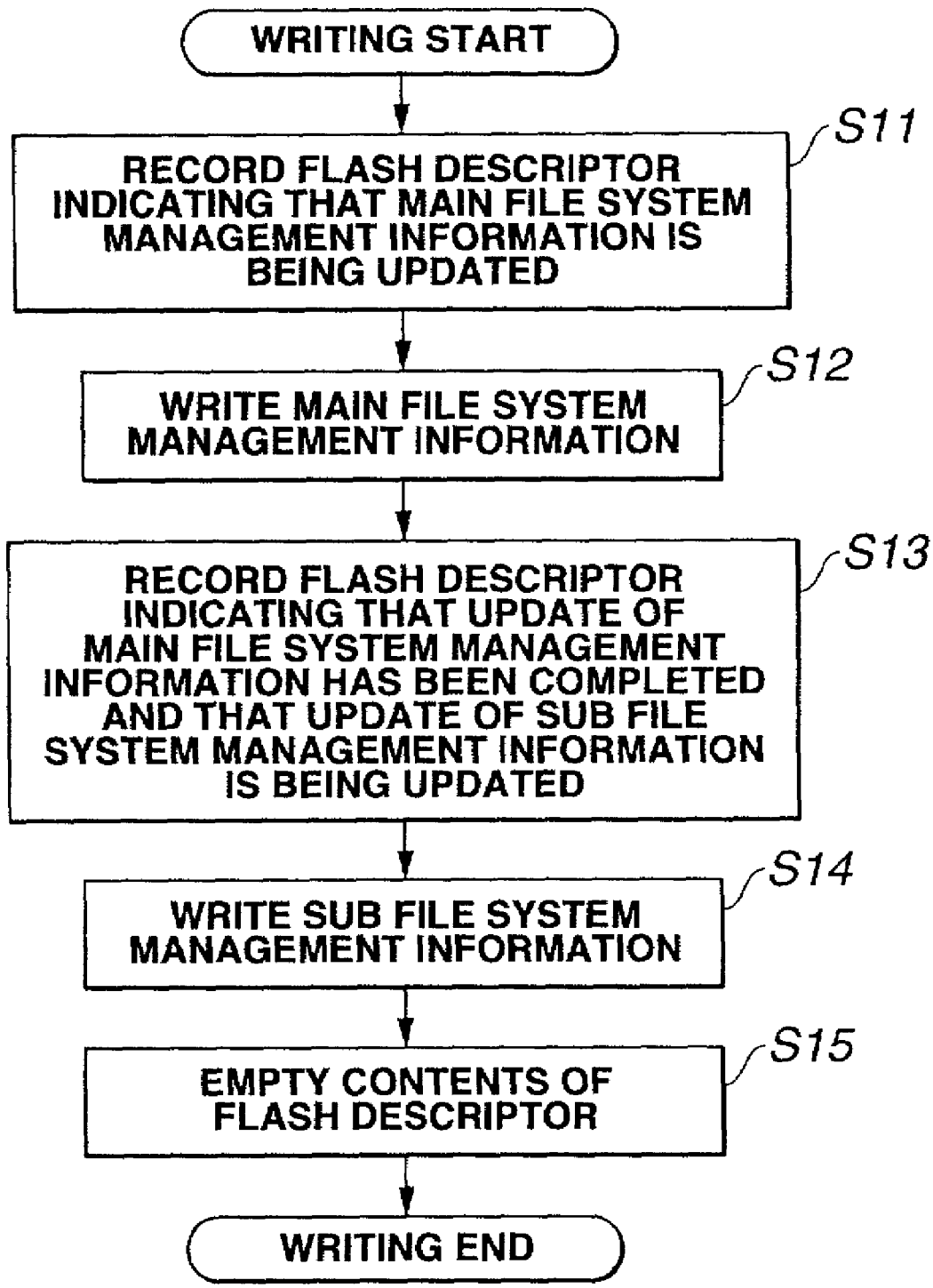
FIG. 3 is a flowchart showing the procedure of updating file system management information.

More specifically, the flowchart in FIG. 3 shows the procedure of updating the file system management information.

At first, in the step S11, the system controller 42 describes a flash descriptor which indicates that the main file system management information is being updated.

Subsequently, in the step S12, the system controller 42 writes the file system management information managed in the memory 43, into the main file system recording area 61.

Subsequently, in the step S13, the system controller 42 records a flash descriptor which indicates that update of the main file system management information has been completed, and then records a flash descriptor which indicates that sub file system management information is being updated.

Subsequently, in the step S14, the system controller 42 writes the file system management information managed by the memory 43, into the sub-file system recording area 62. The content which is written in this step is the same as the content that has been written into the main file system recording area.

Subsequently, in the step S15, the system controller 42 empties the contents of the flash descriptor. Empty flash descriptor means that update of the file system management information of the main file system recording area 61 and the sub file system recording area 62 has been completed.

The file system management information is updated as described above.

Figure 4:
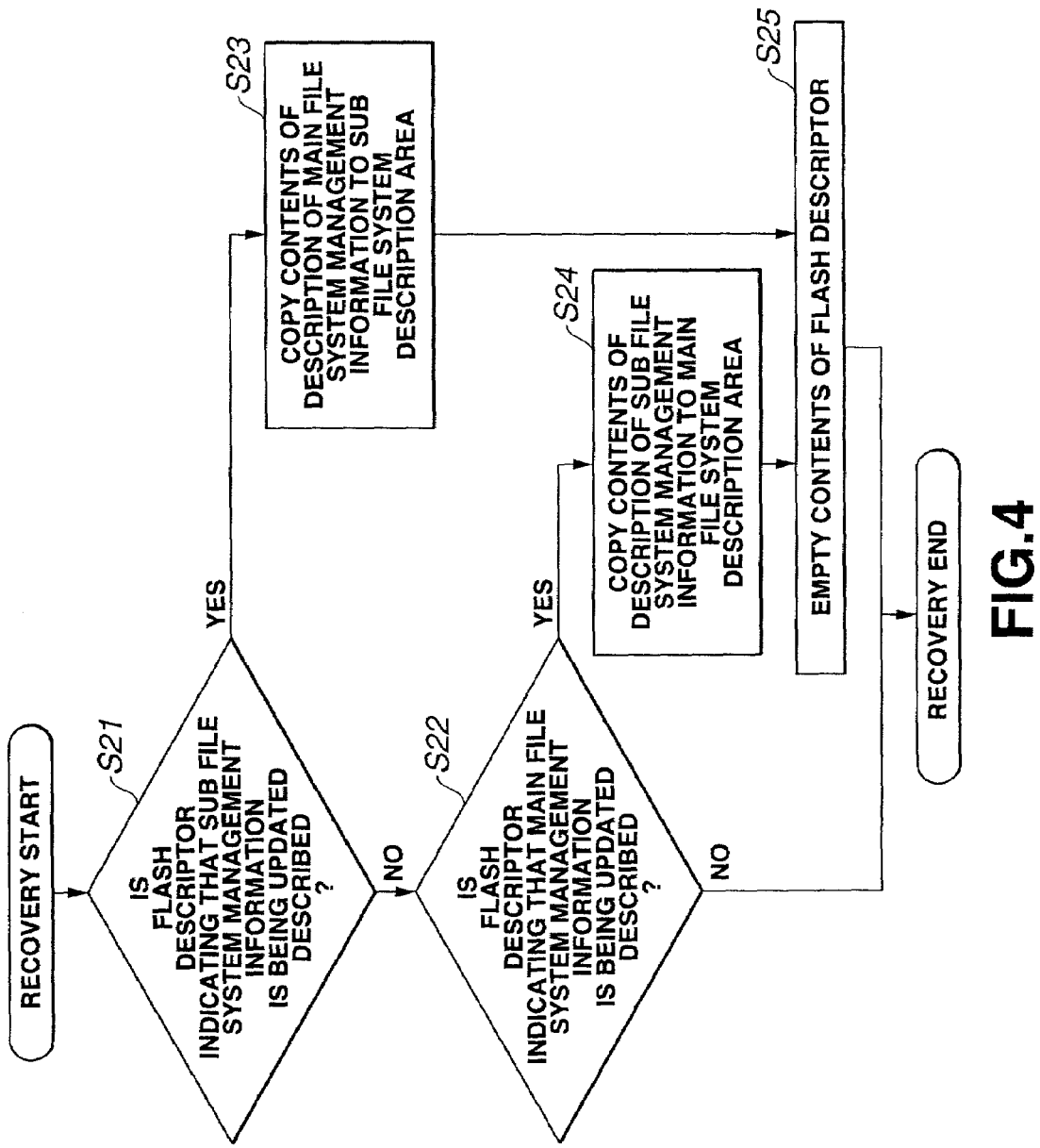
FIG. 4 is a flowchart showing the procedure of updating file system management information when mounting a hard disc.

Next, the flowchart in FIG. 4 shows the processing procedure when mounting of the hard disc 50 is carried out.

At first, in the step S21, the system controller 42 refers to the flash descriptor to determine whether a flash descriptor indicating that the sub file system management information is being updated is described or not. If it is not described, the processing goes to the step S22. Otherwise, if it is described, the processing goes to the step S23.

Subsequently, in the step S22, the system controller 42 refers to the flash descriptor to determine whether a flash descriptor indicating that the main file system management information is being updated is described or not. If it is not described, the processing is terminated. Otherwise, if it is described, the procedure goes to the step S24.

Subsequently, in the step S23, the system controller 42 copies the contents of the description of the main file system management information, onto the sub file system recording area 62. When copying to the sub file system recording area 62 is finished, the procedure goes to the step S25.

Subsequently, in the step S24, the system controller 42 copies the contents of the description of the sub file system management information, onto the main file system recording area 61. When copying to the main file system recording area 61 is finished, the procedure goes to the step S25.

Subsequently, in the step S25, the system controller 42 empties the contents of the descriptions in the flash descriptor.

By thus updating the file system management information, for example, recovery can be achieved up to the status before the update of the file system management information is performed or to the status at the time when the update is perfectly finished, if reading of the hard disc 50 is next started even after a power failure occurs and update processing is once stopped while updating the file system management information. It is therefore possible to eliminate a situation that the management information of the file system is broken.

Also, the system controller 42 periodically performs update processing (steps S11 to S15) of the file system management information, for every predetermined time. If television broadcasting is recorded by the digital video recorder 1, for example, recording operation continues for a long time in some cases. In those cases, recording ends before the file system is updated if a power failure occurs during data recording, where the file system management information is updated only at the time when recording ends. Therefore, those files that have already been recorded completely cannot be reproduced. The system controller 42 is hence arranged so as to update periodically the file system management information including the files, recording of which has been completed, for every predetermined time period, even while recording operation of data continues.

Also, additional information and control information of AV data stored as a TS according to MPEG are described in the main content management information and the sub content management information which are recorded in the data storage area 52. Recorded as content management information are, for example, a title name of AV data, a file name in the file system, a recording start time, a recording period, related information such as a channel name, a program name, and the like which are described in EPG and the like, characteristic feature information, information concerning compression, a list of time stamps and byte offsets from the file top, and thumbnail images, index images, and the like of video images. The characteristic feature information means a pointer to a characteristic point of a video image (e.g., a screen of a scene change, a screen of CM, and the like).

Information having equal data contents is described in the main content management information and the sub content management information.

In case of updating the content management information, procedure information which shows whether the main content management information or the sub content management information is updated is recorded on the hard disc 50.

In addition, to manage the update status of these pieces of content management information, update procedure information concerning the main content management information and the sub file system management information are recorded on the hard disc 50. This update procedure information of the content management information is called robust descriptor. This robust descriptor is stored in a robust descriptor recording area 64 in the header area 51. The robust descriptor describes that the main content management information is being updated, that update of the main content management information has been completed, that the sub content management information is being updated, and that update of the sub content management information has been completed.

Figure 5:
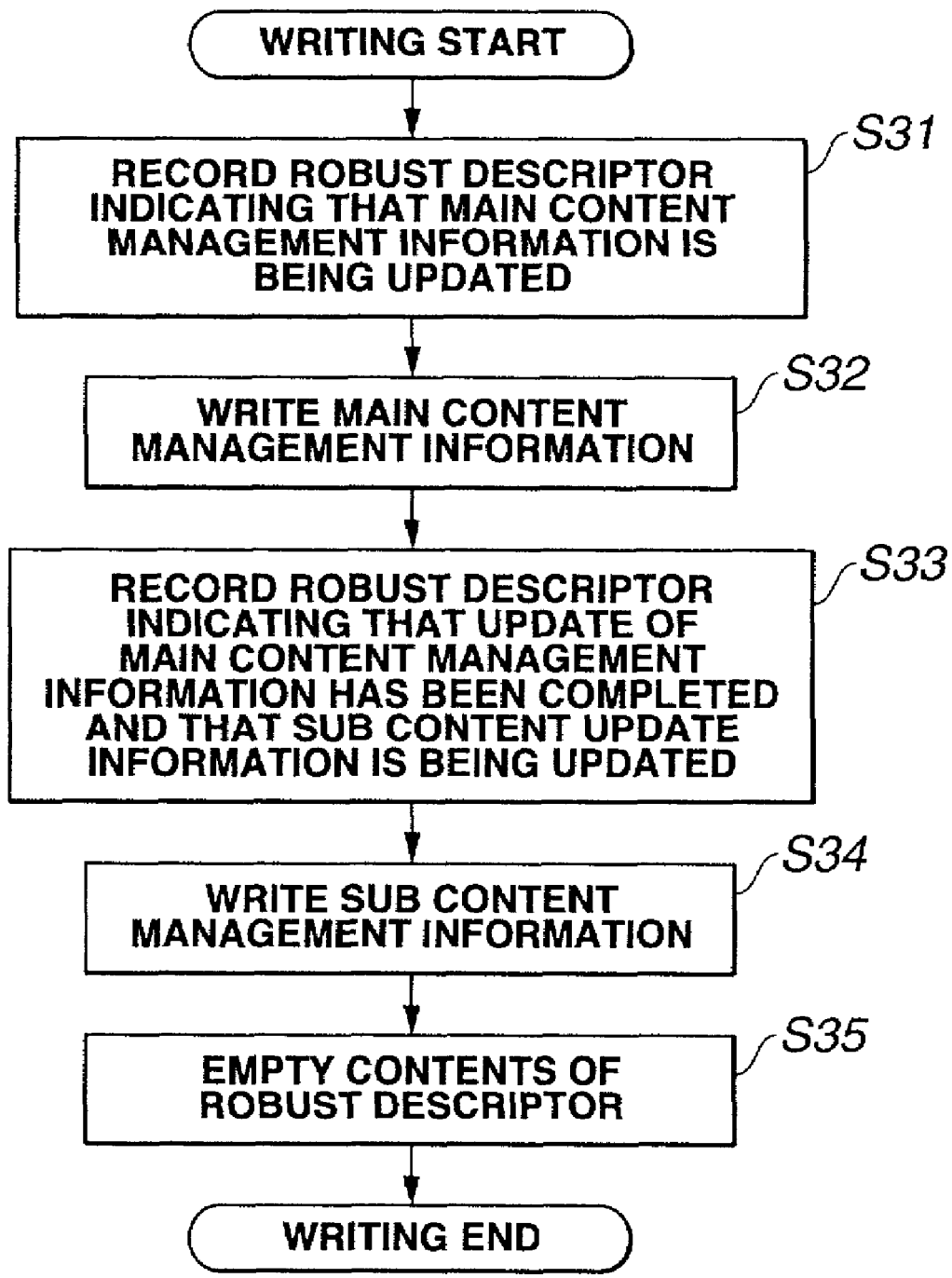
FIG. 5 is a flowchart showing the procedure of updating content management information.

Specifically, the update procedure of the content management information is shown in the flowchart in FIG. 5.

At first, in the step S31, the system controller 42 records a robust descriptor which indicates that the main content management information is being updated.

Subsequently, in the step S32, the system controller 42 writes content management information managed by the memory 43, into a file which describes the main content management information.

Subsequently, in the step S33, the system controller 42 records a robust descriptor which indicates that update of the main content management information has been completed, and records next a robust descriptor which indicates that the sub content management information is being updated.

Subsequently, in the step S34, the system controller 42 writes the content management information managed by the memory 43, into a file which describes the sub content management information. The contents which are written at this time are the same as the contents which have been written into the main content recording area.

Subsequently, in the step S35, the system controller 42 empties the contents of the robust descriptor. The empty robust descriptor means that update of the main content management information and the sub content management information is completed.

Content management information is updated as described above.

Figure 6:
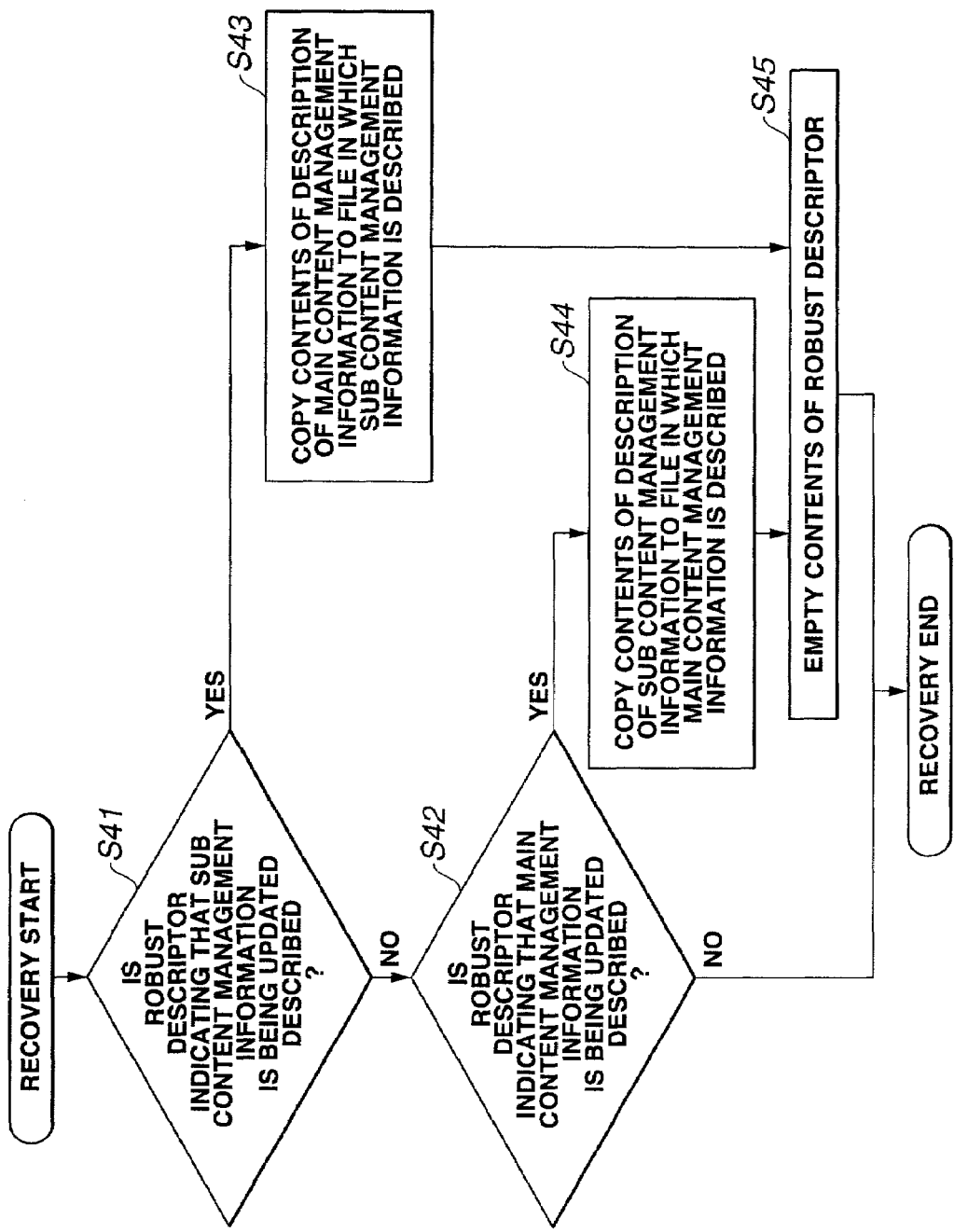
FIG. 6 is a flowchart showing the procedure of updating content management information when mounting a hard disc.

Next, the processing procedure when mounting the hard disc 50 is shown in the flowchart in FIG. 6.

At first, in the step S41, the system controller 42 refers to the robust descriptor to determine whether the robust descriptor indicating that the sub content management information is being updated is described or not. If it is described, the processing goes to the step S42. Otherwise, the processing goes to the step S43.

Subsequently, in the step S42, the system controller 42 refers to the robust descriptor to determine whether the robust descriptor indicating that the main content management information is being updated is described or not. If it is not described, the processing is terminated. Otherwise, the processing goes to the step S44.

Subsequently, in the step S43, the system controller 42 copies the contents of the description of the main content management information into a file in which the sub content management information is described. When copying of the sub content management information is finished, the processing goes to the step S45.

Subsequently, in the step S44, the system controller 42 copies the contents of the description of the sub content management information into a file which describes the main content management information. When the main content management information is finished, the processing goes to the step S45.

Subsequently, in the step S45, the system controller 42 empties the contents of the description of the robust descriptor.

By thus updating the content management information, for example, recovery up to the status before update of the content management information is carried out or the status at the time when update is completely finished when reading of the hard disc 50 is started next, even in case where a power failure occurs and update processing is stopped while updating the content management information. Accordingly, it is possible to eliminate the situation that the management information of the contents is broken.

Also, the system controller 42 periodically performs update processing (steps S31 to S35) on the content management information, for every predetermined time period. If television broadcasting is recorded by this digital video recorder 1, for example, there is a case that recording operation continues for a long period. In this case, if the content management information is updated only at the time when recording is finished, recording is terminated without updating contents, when a power failure occurs during data recording. Therefore, data which has already been recorded cannot be reproduced. As a result, for example, the system controller 42 updates the content management information including files recording of which has been finished, for every predetermined time period, even if operation of recording data continues.

In some cases, the main content management information 66 and the sub content management information 67 which are recorded in the data storage area 52 is not managed for only one file but for a plurality of files. To update these kinds of content management information, data writing must be performed on a series of files which construct the content management information. Operation of updating the series of files as described above is called a transaction.

Also, in case where the content management information is updated by a transaction, the main content management information and the sub file system management information are recorded onto the hard disc 50, in order to manage the update status of both kinds of content management information. The procedure information for updating the content management information by means of the transaction is called a transaction descriptor. This transaction descriptor is stored in to the transaction descriptor recording area 65 in the header area 51. This transaction descriptor describes the file name and file size of the file being updated, that update of content management information is stated by transaction, and that the file is being copied from the main content management information to the sub content management information. The file name and file size of the file being updated are described into the transaction descriptor, for example, as shown in FIG. 7.

Figure 8:
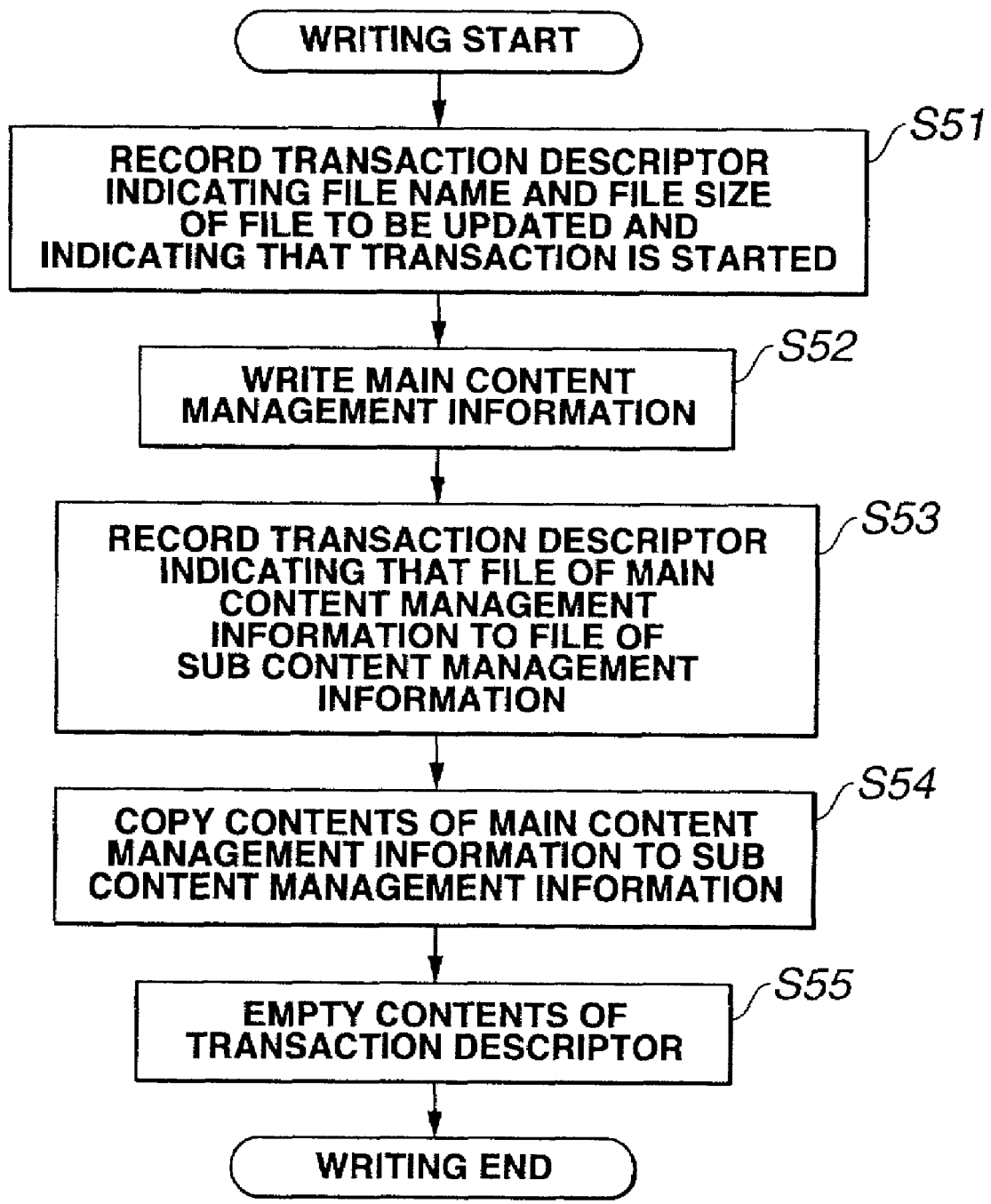
FIG. 8 is a flowchart showing the procedure of updating content management information by transaction.

The procedure of updating the content management information is specifically shown in the flowchart in FIG. 8.

At first, in the step S51, the system controller 42 records the file name and file size of the file to be updated and a transaction descriptor which indicates that update of the content management information is started.

Subsequently, in the step S52, the system controller 42 writes content management information managed by the memory 43, into a series of files in which the main content management information is described.

Subsequently, in the step S53, the system controller 42 records a transaction descriptor which indicates that a file is being copied from the main content management information to the sub content management information.

Subsequently, in the step S54, the system controller 42 copies the file in which the main content management information is described to the file in which the sub content management information is described.

Subsequently, in the step S55, the system controller 42 empties the contents of the transaction descriptor. Note that the empty transaction descriptor means that update of the main content management information and the sub content management information is finished.

Management information is updated as described above.

Figure 9:
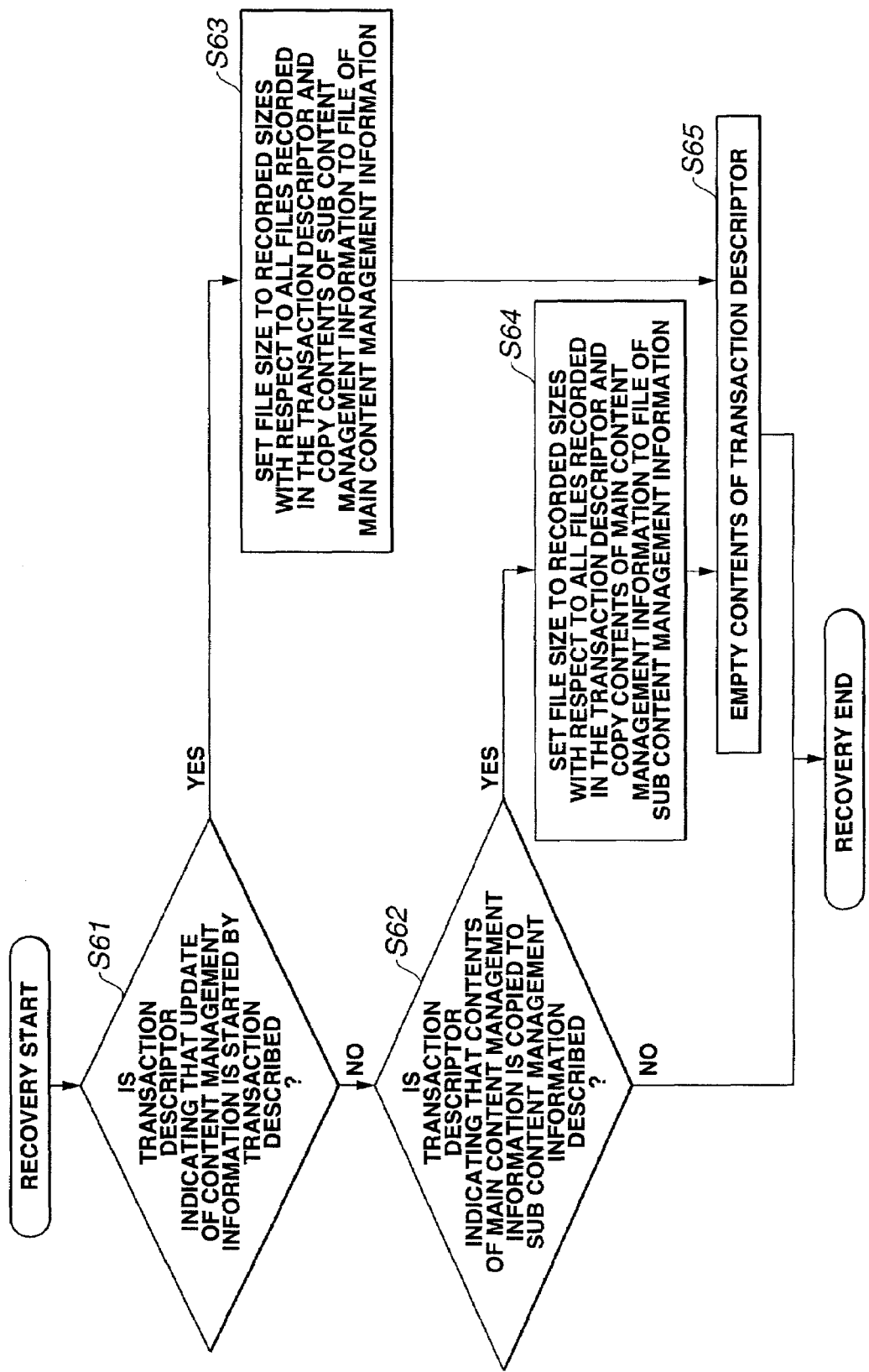
FIG. 9 is a flowchart showing the procedure of updating content management information by transaction when mounting a hard disc.

Next, the processing procedure when mounting the hard disc 50 is shown in the flowchart in FIG. 9.

At first, in the step S61, the system controller 42 refers to the transaction descriptor to determine whether transaction descriptor means that update of the content management information has been started by transaction is described or not. If it is not described, the processing goes to the step S62. Otherwise, the processing goes to the step S63.

Subsequently, in the step S62, the system controller 42 refers to the transaction descriptor to determine whether a transaction descriptor which indicates that a file is being copied from the main content management information to the sub content management information is described or not. If it is not described, processing is finished. Otherwise, the processing goes to the step S64.

Subsequently, in the step S63, the system controller 42 sets the file sizes to described file sizes and copies the contents described in the sub content management information to a series of files of the main content management information, with respect to all files described in the transaction descriptor. When the copying ends, the processing then goes to the step S65.

Subsequently, in the step S64, the system controller 42 sets the file sizes to described file sizes and copies the contents described in the main content management information to a series of files of the sub content management information, with respect to all files described in the transaction descriptor. When the copying ends, the processing goes to the step S65.

Subsequently, in the step S65, the system controller 42 empties the contents of the description of the transaction descriptor.

By thus updating the contents, for example, recovery can be achieved up to the status before the update is performed by transaction or up to the status at the time when the update is perfectly finished by transaction, when reading of the hard disc 50 is next started even after a power failure occurs and update processing is once stopped while updating the file system management information. It is therefore possible to eliminate a situation that the content management information of the file system is broken.

Also, the system controller 42 periodically performs update processing (steps S51 to S55) of the content management information for every predetermined time period. If television broadcasting is recorded by the digital video recorder 1, for example, recording operation continues for a long time in some cases. In those cases, recording ends before the content management information is updated if a power failure occurs during data recording, where the content management information is updated only at the time when recording ends. Therefore, recording which has already been done is wasted. The system controller 42 is hence arranged so as to update periodically the content management information of the contents recording of which has been completed, for every predetermined time period, even while recording of data continues.

The explanation to the embodiment of the present invention has shown an example in which a hard disc has been cited as a recording medium. However, any kind of recording medium may be used as long as it enables digital recording. For example, the recording medium may be an optical disc or the like.

In addition, the flash descriptor, robust descriptor, and transaction descriptor may be recorded in another non-volatile memory in the digital video recorder 1.

What is claimed is:

1. A data recording/reproducing apparatus for recording or reproducing content data onto a disc-like recording medium, comprising:

management means for generating management information to be recorded onto the disc-like recording medium; and control means for performing recording/reproducing control on the disc-like recording medium; wherein first and second management areas for storing management information and a procedure storage area for storing recording procedure of recording management information into each of the management areas, and the control means records same management information into the first and second management areas, and records information indicating that writing of management information onto the first management area is started and information indicating that writing of management information onto the second area is started, into the procedure storage area.

2. The data recording/reproducing apparatus according to claim 1, wherein the control means reproduces management information from either the first or second management area, based on the recording procedure information stored in the procedure storage area.

3. The data recording/reproducing apparatus according to claim 1, wherein the control means records information indicating that writing of management information onto the first management area is started onto the procedure storage area, records the management information onto the first management area, records information indicating that writing of management information onto the second storage area is started onto the procedure storage area, records same management information as the management information recorded onto the first management information, onto the second management area, and deletes information recorded on the procedure storage area when recording onto the second management area ends.

4. The data recording/reproducing apparatus according to claim 3, wherein the control means reproduces management information from the second management area if the information indicating that the writing of management information onto the first management area is started is recorded in the procedure storage area, and the control means reproduces management information from the first management area if the information indicating that the writing of management information onto the second management area is started is recorded in the procedure storage area.

5. The data recording/reproducing apparatus according to claim 1, wherein the management information is management information of the file system of the disc-like recording medium.

6. The data recording/reproducing apparatus according to claim 1, wherein the management information is content data management information for managing content data recorded on the disc-like recording medium.

7. A data recording/reproducing apparatus for recording or reproducing content data onto or from a disc-like recording medium, comprising:

a file system for generating management information of a file system of the disc-like recording medium;

file management means for generating file management information of content data to be recorded onto the disc-like recording medium; and control means for control of recording/reproducing with respect to the disc-like recording medium; wherein first and second file system management areas for storing management information of the file system, first and second content data management areas for storing management information of content data, a first procedure storage area for storing recording procedure information of recording onto each of the file system management areas, and a second procedure storage area for storing recording procedure information onto the content data management areas are provided in the disc-like recording medium, and the control means records same file system management information onto the first and second file system management areas, records same content data management information onto the first and second content data management areas, records information indicating that writing of the file system management information onto the first file system management area is started as well as information indicating that writing of the file system management information onto the second file system management area is started, onto the first procedure storage area, and records information indicating that writing of the content data management information onto the first content data management area is started as well as information indicating that writing of the content data management information onto the second content data management area is started, onto the second procedure storage area.

8. The data recording/reproducing apparatus according to claim 7, wherein the control means reproduces the file system management information from either one of the first and second file system management areas, based on the recording procedure information stored in the first procedure storage area, and reproduces the content data management information from either one of the first and second content data management areas, based on the recording procedure information stored in the second procedure management area.

9. A data recording/reproducing method for recording or reproducing content data onto or from a disc-like recording medium, wherein management information to be recorded onto the disc-like recording medium is generated, first and second management areas for storing the management information and a procedure storage area for storing recording procedure information the management information onto the management areas are provided on the disc-like recording medium, and same management information is recorded onto the first and second management areas, and information indicating that writing of management information onto the first management area is started and information indicating that writing of management information onto the second management area is started are recorded onto the procedure storage area.

10. The data recording/reproducing method according to claim 9, wherein management information is reproduced from either the first or second management area, based on the recording procedure information stored in the procedure storage area.

11. The data recording/reproducing method according to claim 9, wherein
   information indicating that writing of management information onto the first management area is started is recorded onto the procedure storage area,
   the management information is recorded onto the first management area,
   information indicating that writing of management information onto the second storage area is recorded onto the procedure storage area,
   same management information as the management information recorded onto the first management area is recorded onto the second management area, and
   information recorded on the procedure storage area is deleted when recording onto the second management area ends.

12. The data recording/reproducing method according to claim 11, wherein management information is reproduced from the second management area if the information indicating that writing of management information onto the first management area is started is recorded on the procedure storage area, and
   management information is reproduced from the first management area if the information indicating that writing of management information onto the second management area is recorded on the procedure storage area.

13. The data recording/reproducing method according to claim 9, wherein the management information is management information of a file system of the disc-like recording medium.

14. The data recording/reproducing method according to claim 9, wherein the management information is content data management information for managing content data to be recorded onto the disc-like recording medium.

15. A data recording/reproducing method for recording or reproducing content data onto or from a disc-like recording medium, wherein
   first and second file system management areas for storing management information of a file system, first and second content data management areas for storing management information of content data, a first procedure storage area for storing recording procedure information onto each of the file system management areas, and a second procedure storage area for storing recording procedure information onto the content data management areas are provided on the disc-like recording medium,
   management information of the file system of the disc-like recording medium is generated,
   file management information of content data to be recorded onto the disc-like recording medium is generated,
   same file system management information is recorded onto the first and second file system management areas,
   same content data management information is recorded onto the first and second content data management areas,
   information indicating that writing of file system management information onto the first file system management area is started and information indicating that writing of file system management information onto the second file system management area is started are recorded onto the first procedure storage area, and
   information indicating that writing of content data management information onto the first content data management area is started and information indicating that writing of content data management information onto the second content data management area is started are recorded onto the second procedure storage area.

16. The data recording/reproducing method according to claim 15, wherein file system management information is reproduced from either the first or second file system management areas, based on the recording procedure information stored in the first procedure storage area, and content data management information is reproduced from either the first or second content data management areas, based on the recording procedure information stored in the second procedure management area.

17. An apparatus for recording/reproducing information to/from a disc-like recording medium, the disc-like recording medium comprising:
   first and second management areas provided for storing management information of content data to be recorded; and
   a procedure storage area provided for storing recording procedure information management information onto each of the management areas, wherein
   same management information is recorded onto the first and second management areas, and information indicating that writing of management information onto the first management area is started and information indicating that writing of management information onto the second management area are recorded onto the procedure management area.

18. An apparatus for recording/reproducing information to/from a disc-like recording medium, the disc-like recording medium comprising:
   first and second file system management areas for storing management information of the file system;
   first and second content data management areas for storing management information of content data to be recorded;
   a first procedure storage area for storing recording procedure information onto each of the file system management areas; and
   a second procedure storage area for storing recording procedure information onto the content data management areas, wherein
   same file system management information is recorded onto the first and second management areas,
   same content data management information is recorded onto the first and second content data management areas,
   information indicating that writing of file system management information onto the first file system management area is started and information indicating that writing of file system management information onto the second file system management area is started are recorded onto the first procedure management area, and
   information indicating that writing of content data management information onto the first content data management area is started and information indicating that writing of content data management information onto the second content data management area is started are recorded onto the second procedure management area.

* * * * *